United States Patent [19]

Perlsweig

[11] 4,444,343

[45] Apr. 24, 1984

[54] STEERING COLUMN ARTICLE HOLDER

[76] Inventor: Leon Perlsweig, 23017 Gainford St., Woodland Hills, Calif. 91364

[21] Appl. No.: 415,403

[22] Filed: Sep. 7, 1982

[51] Int. Cl.$^3$ .............................................. B60R 7/02
[52] U.S. Cl. .................................... 224/276; 224/277
[58] Field of Search ............... 224/276, 277, 222, 226, 224/276, 277; 40/10 A, 10 B; D3/40; 206/806; 248/611, 612, 219.3

[56] References Cited

U.S. PATENT DOCUMENTS

| 901,652 | 10/1908 | Seydel . | |
| 1,169,198 | 1/1916 | Schumacher . | |
| 1,401,770 | 12/1921 | Golden . | |
| 1,483,592 | 2/1924 | Pelstring | 224/276 X |
| 2,027,517 | 1/1936 | Cobbs | 224/276 X |
| 2,887,216 | 5/1959 | Hargraves | 224/277 |
| 4,274,567 | 6/1981 | Sawyer | 24/277 X |

FOREIGN PATENT DOCUMENTS 176180  6/1935  Switzerland .

Primary Examiner—Steven M. Pollard
Attorney, Agent, or Firm—Brumbaugh, Graves, Donohue & Raymond

[57] ABSTRACT

An article holding receptacle, such as an expandable envelope, is releasably secured to the steering column of an automotive vehicle by means of an elasticized band wrapped partly around the steering column hooked at both ends to a clip from which the envelope is releasably attached. The length of the band is such that, when engaged at its ends with the clip, it is under sufficient tension to be retained snugly against the steering column. The envelope is secured to the clip by releasable means such as a paper fastener and includes means to prevent skewing of the envelope about the fastener.

4 Claims, 3 Drawing Figures

U.S. Patent    Apr. 24, 1984    4,444,343
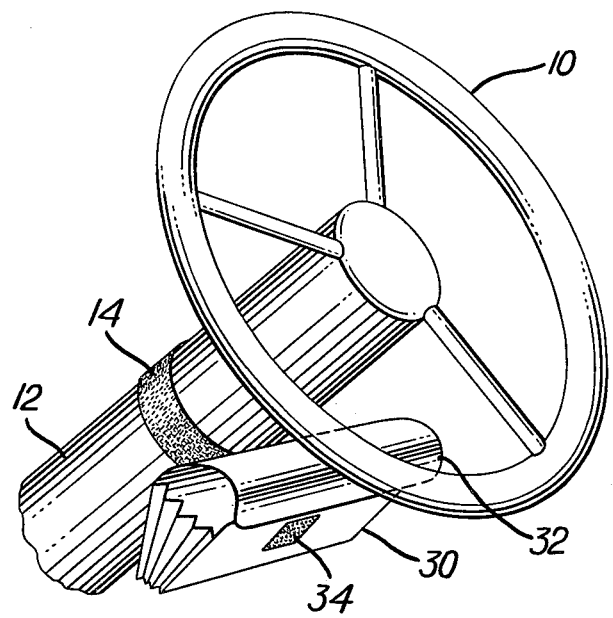
FIG. 1
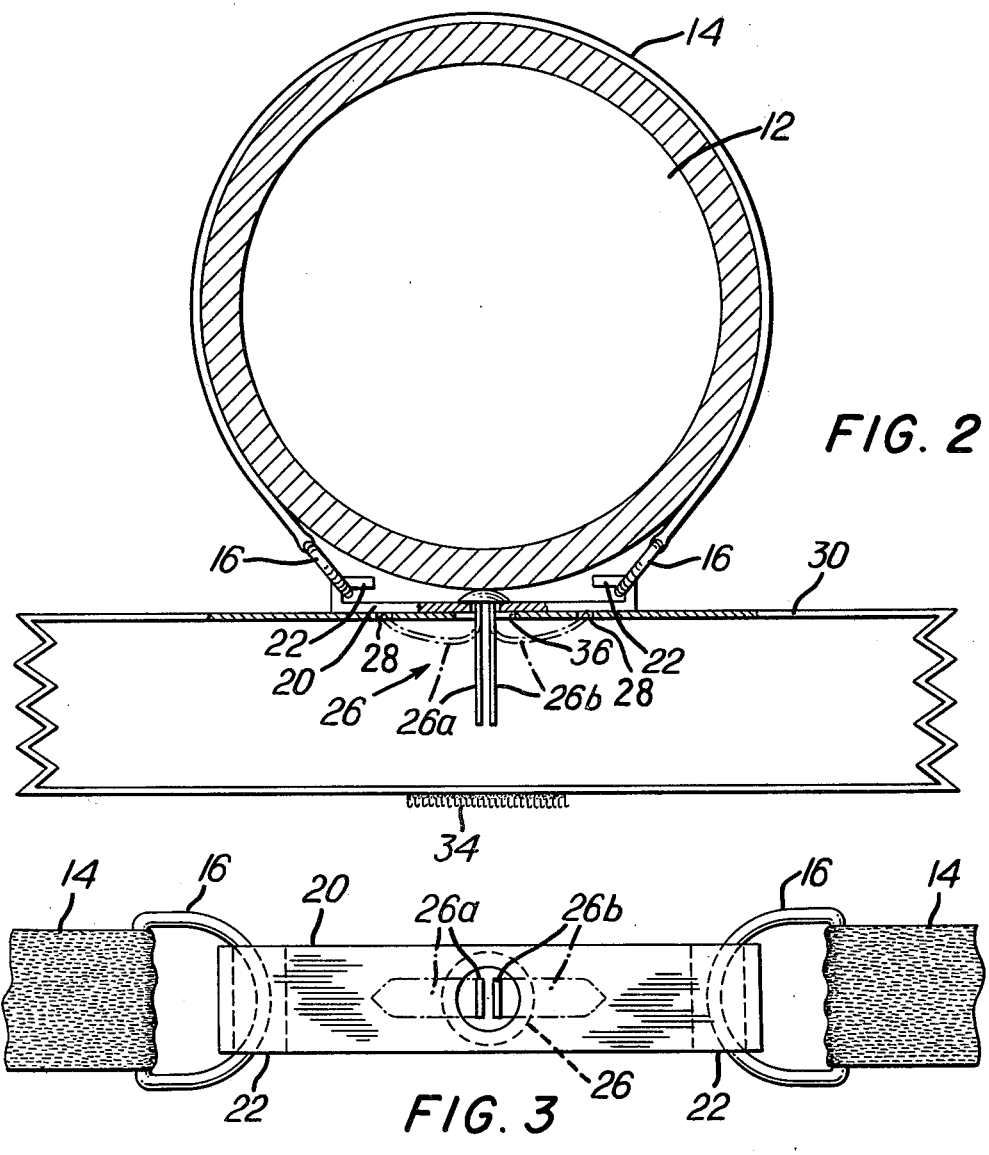
FIG. 2
FIG. 3

STEERING COLUMN ARTICLE HOLDER

BACKGROUND OF THE INVENTION

This invention relates to article holders and, more particularly, to devices, particularly adapted to be secured to the steering columns of automotive vehicles and the like, which include receptacle means for retaining articles such as receipts, currency, etc. conveniently accessible to the vehicle operator.

In the course of highway travel, it is common for automobile travellers to accumulate various papers, such as gasoline and toll receipts, hotel bills, restaurant receipts, etc., that the traveller wishes to preserve for future use. In the case of commercial drivers, such as salesmen or truck drivers, it becomes a virtual necessity that these papers, along with invoices and other commercial documents, be carefully preserved for business and tax purposes.

It is common for motorists to attempt to save such documents by the obvious expedients of putting them in a pocket or handbag or, in many cases, stuffing them in the glove compartment of the automobile or truck, if it has one and if it can be conveniently reached from the driver's seat. Other makeshift expedients have been used such as clips or rubber bands on sun visors, trays on the vehicle dashboard, etc., none of which provides a safe repository for these important documents.

Various types of devices for mounting on the dashboard, sun visor, etc. of an automobile are commercially available, which provide receptacles for containment of specific items such as cigarettes, coins and maps, for example. There have also been devised in the past various devices for holding drivers' aids or conveniences within reach of the driver by attaching them to the steering column. For example, U.S. Pat. No. 1,483,592 to Pelstring discloses a matchbox holder attached to the steering column of an automotive vehicle by means of a spring wrapped around the column and hooked to the matchbox receptacle. Various forms of rigid clamps, requiring tools for installation, are also known in the prior art, for example, in U.S. Pat. Nos. 2,634,940 to Carty et al. and 2,918,202 to Constantine et al.

These prior art devices are characterized in that they are specifically intended for a single purpose or require tools to mount and dismount from the steering column. In this regard, because modern automobiles in general have only short sections of steering column between the dashboard and the steering wheel available for mounting, many of these prior art devices are effectively unusable on present-day vehicles.

SUMMARY OF THE INVENTION

It is the object of the present invention to provide an article holding arrangement, adapted to be mounted on the steering column of present-day automotive vehicles, which is simple to attach and remove, without tools, and which is capable of releasably supporting a variety of article receptacles within easy reach of the driver.

In accordance with the invention, an elasticized band, covered with a soft, non-scratching fabric, of an unstretched length to wrap partly around the steering column of the vehicle, is provided at each end with a hook or ring for engaging a receptacle supporting clip. The clip has a hook or detent at each end for engaging the respective rings on the ends of the elastic band and maintaining the latter under tension snugly against the steering column. The clip carries a receptacle holding fastener by means of which the desired receptacle may be releasably coupled to the clip. The receptacle, which, for example, may be in the form of a small accordian envelope for holding charge card receipts, paper currency and the like, includes on its rear surface means for engaging the receptacle supporting fastener on the clip. Preferably, the envelope is provided with a flap that may be firmly closed, such as by a snap or Velcro fastener, so that papers inserted in the receptacle are safely retained in it.

The arrangement according to the invention is adaptable to almost any automotive vehicle; the elastic band being selected to be of a length and general flexibility such that it can conform to the steering column size and shape of most modern automotive vehicles. The simple clip arrangement allows the device to be installed in seconds by the purchaser and the releasable receptacle enables the driver to remove it, together with its contents, when desired, thereby to have his accumulated receipts available for processing without removing the supporting band from the vehicle.

DESCRIPTION OF THE DRAWINGS

The foregoing objects and features of the invention will become more readily apparent from the following detailed description thereof, taken in conjunction with the accompanying drawings in which FIG. 1 is a pictorial representation of an exemplary embodiment of the invention mounted on the steering column of a vehicle;

FIG. 2 is a section through the steering column of FIG. 1 showing the manner in which the device is mounted to the steering column; and FIG. 3 is a view showing details of the band and clip assembly.

DETAILED DESCRIPTION OF THE INVENTION

Turning now to FIG. 1, numeral 10 represents the steering wheel of a typical automobile mounted on the steering column 12 which extends to the steering mechanism. It will be understood that the length of the steering column between the steering wheel and the dashboard of the vehicle (not shown) will vary with the different vehicle models and that other automotive appurtenances, such as the transmission lever, directional signal control and the like, normally mounted on the steering column, are not shown in the schematic representation of FIG. 1.

The article holder of the invention is shown mounted on the steering column 12 by means of an elasticized, stretchable band 14 which wraps around and snugly engages the steering column when stretched and under tension. The band 14 is of a length such that it must be stretched to reach around the steering column and may be made of commonly available elasticized fabric having a soft, non-scratching surface so as not to mar the surface of the steering column.

As shown in FIG. 2, the ends of the elasticized band 14 are connected to respective ends of a metal clip member 20. For this purpose, the ends of the elasticized band are provided with hook members, such as "D" rings 16 (see FIG. 3) for engaging detents 22 on the ends of the clip 20. Clip 20 may be formed of bent or cast metal or plastic of sufficient strength to supply the required tension to the band 14 and support the receptacle 30, as described below.

Extending from the center of the clip 20 is a fastener 26, which, in its simplest form, may be a simple two-prong flexible fastener commonly used to hold papers together. To accommodate the fastener 26, the clip 20 may be provided with a hole of suitable size at its corner. As will be recognized, with the band 14 stretched around the steering column and hooked by the rings 16 to the detents 22 of the clip 20, the latter will be held snugly against the steering column and the fastener 26, which is inserted through the hole in the clip prior to assembly, will therefor be retained firmly in place. If desired, the fastener 26 may be cemented or welded to the clip 20.

The fastener 26 provides readily releasable means for supporting a suitable receptacle 30 from the steering column within easy reach of the driver. In the example shown, the receptacle is a simple paper or plastic accordian envelope, of the type commonly available for storing cancelled checks or papers of similar size. The envelope 30 may, for example, include a flap 32 adapted to snap closed or, as illustrated in the drawings, a Velcro closure 34 (with mating element on the inner surface of flap 32) for securely closing the envelope.

As will be appreciated, the article holding assembly of the invention may be readily fastened to the steering column of the automobile simply by stretching the band 14 around the column and engaging the detents 22 on the clip with the rings 16 and, thereafter mounting the receptacle, e.g., the envelope 30, by inserting the fastener through an opening 36 (FIG. 3) in the back of the envelope and spreading the prongs of the fastener 26 to retain the envelope in place. So positioned, the envelope provides a ready receptacle for the driver to store gasoline and toll receipts, restaurant stubs and the like accumulated during the course of a day's journey or business rounds of the driver. At the end of the day, or whenever else desired, the driver may readily remove the envelope from the steering column simply by squeezing the fastener ends together and sliding the envelope off the column. Should it be desired to remove the entire assembly from the vehicle, this can be effected simply by unhooking the rings 16 from the clip 20.

To maintain the receptacle 30 in the position shown in FIG. 1, that is, to prevent its skewing about the fastener 26, detents 28 are provided in the rear interior wall to engage the tips of the fastener prongs 26a and 26b. In the simplest form, shown in FIG. 2, the detents are narrow, vertical slots in the receptacle wall of a length just sufficient to accept insertion of the tips of the fastener prongs. More elaborate types of detents may, of course, be provided to engage the simple fastener shown or specially-shaped fasteners, as desired.

It will be understood that the arrangement of the invention is adaptable to retaining various types of receptacles and devices to the steering column other than the accordian envelope shown. For example, holders for cigarettes, coins and sunglasses can be designed with an appropriate opening to be engaged by the fastener 26 and thereby releasably retained on the steering column. Similarly, fasteners other than the device 26 shown may be employed to hold the receptacle to the clip. For example, a snap or Velcro attachment may be employed.

It will be understood that many variations of the various elements of the invention will occur to those skilled in the art without departing from the inventive concept and the scope of the invention is to be limited only by the appended claims.

I claim:

1. An article holder for mounting on a vehicle steering column or the like comprising:
    an elongated stretchable band of non-scratching flexible material adapted to engage the periphery of said steering column, said stretchable band including hook means at each end thereof,
    non-stretchable clip means having a pair of spaced detent means adapted to engage respective ones of said hook means on said stretchable band to retain said band under tension and in snug engagement with said steering column,
    a receptacle for articles, said receptacle having an aperture in one wall thereof, and
    fastener means including a pair of bendable prongs adapted to be inserted through said aperture and manually bent outwardly and backwardly against the interior surface of said receptacle wall,
    said receptacle including means for engaging said fastener means to prevent relative rotation between said receptacle and said clip.

2. The article holder of claim 1 wherein said means for engaging said fastener means comprises detent means in said receptacle for engaging the prongs of said fastener.

3. The article holder of claim 1 wherein said receptacle means comprises an envelope for receiving papers, said envelope having a closable flap for retaining papers therein.

4. The article holder of claim 1 wherein said detent means comprises at least one slot in said wall for receiving the end of one of said prongs.

* * * * *

UNITED STATES PATENT AND TRADEMARK OFFICE
CERTIFICATE OF CORRECTION

PATENT NO.  :  4,444,343
DATED       :  April 24, 1984
INVENTOR(S) :  Leon Perlsweig It is certified that error appears in the above-identified patent and that said Letters Patent is hereby corrected as shown below:

Col. 4, line 48, "claim 1" should read --claim 2--.

Signed and Sealed this

Ninth Day of April 1985

[SEAL]

Attest:

DONALD J. QUIGG

Attesting Officer     Acting Commissioner of Patents and Trademarks